(12) United States Patent
Mussro et al.

(10) Patent No.: US 8,846,262 B2
(45) Date of Patent: Sep. 30, 2014

(54) REACTIVE COMPRESSOR SURGE MITIGATION STRATEGY FOR A FUEL CELL POWER SYSTEM

(71) Applicant: GM Global Technology Operations LLC, Detroit, MI (US)

(72) Inventors: Joseph Mussro, Pittsford, NY (US); Yanyan Zhang, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/660,083

(22) Filed: Oct. 25, 2012

(65) Prior Publication Data
US 2014/0120447 A1     May 1, 2014

(51) Int. Cl.
*H01M 8/04*     (2006.01)

(52) U.S. Cl.
USPC .......................................................... 429/444

(58) Field of Classification Search
None
See application file for complete search history.

(56) References Cited

U.S. PATENT DOCUMENTS

| | | | |
|---|---|---|---|
| 6,815,106 B1* | 11/2004 | Salvador et al. | 429/427 |
| 2004/0161647 A1* | 8/2004 | Rainville et al. | 429/25 |
| 2005/0095474 A1* | 5/2005 | Rainville | 429/22 |
| 2005/0100777 A1 | 5/2005 | Gurin et al. | |
| 2008/0209807 A1 | 9/2008 | Tsangaris et al. | |
| 2009/0325010 A1* | 12/2009 | Kirklin | 429/22 |

OTHER PUBLICATIONS

Non-Final Office Action dated Dec. 16, 2013 pertaining to U.S. Appl. No. 13/660,020, filed Oct. 25, 2012.

* cited by examiner

*Primary Examiner* — Patrick Ryan
*Assistant Examiner* — Jose Colucci Rios
(74) *Attorney, Agent, or Firm* — Dinsmore & Shohl LLP (57) ABSTRACT

Systems and methods to mitigate surge conditions in a compressor of a vehicle fuel cell system. A first surge mitigation strategy regulates a cathode backpressure valve, if the compressor is operating at or above a threshold speed. A second surge mitigation strategy regulates a recirculation valve if the compressor is operating below the threshold speed. In one form, a feedback-based control may be used as part of a larger feedforward-based control strategy such that the mitigation is part of a reactive control strategy. The strategy may additionally be implemented in a processor-based controller.

20 Claims, 5 Drawing Sheets

REACTIVE COMPRESSOR SURGE MITIGATION STRATEGY FOR A FUEL CELL POWER SYSTEM

BACKGROUND OF THE INVENTION

The present invention relates generally to mitigating compressor surge conditions in a vehicle fuel cell power system, and more particularly to systems and methods for mitigating compressor surge conditions based on the speed of the compressor.

Fuel cells are one alternative to using gasoline or related petroleum-based sources as the primary source of energy in vehicular propulsion systems. In particular, by combining reactants in an electrochemical reaction within the fuel cell, electric current can be generated and used to power a motor or perform other useful work. In one form, the motor being powered by the electric current may propel the vehicle, either alone or in conjunction with a petroleum-based combustion engine. In automotive applications, individual fuel cells may be arranged in series or parallel as a fuel cell stack in order to produce a higher voltage or current yield. Furthermore, still higher yields may be achieved by combining more than one stack.

In a typical fuel cell, hydrogen or another reactant gas is supplied to the anode of the fuel cell, while an oxygen-based reactant (for example, ambient air) is supplied to the cathode of the fuel cell. The hydrogen is catalytically broken into electrons and positively charged ions such that an electrolyte layer that separates the anode from the cathode allows the ions to pass to the cathode while preventing electrons from doing the same. Instead, electrons are routed around the electrolyte layer through a load and back to the cathode, allowing electrical power to be harnessed. At the cathode, the ions, electrons, and supplied oxygen or air are typically combined to produce water and heat. Individual fuel cells may be arranged in series or parallel as a fuel cell stack in order to produce a higher voltage or current yield. Furthermore, still higher yields may be achieved by combining more than one stack.

To improve the delivery of the reactant gases, pressurized sources are often used. For example, the air being delivered to the cathode side of a fuel cell system is often by way of a compressor, where ancillary equipment—such as valves, controllers or the like—is used to regulate the airflow between the compressor and fuel cell. An inherent attribute of a compressor-aided delivery system (at least as it relates to cathode-side operation) is that the cathode's pressure and flow control are coupled together; this coupling means that stable operation can often be best achieved through a feed-forward-based control strategy to take advantage of known or ascertainable mathematical relationships. In this way, a command signal based on known operational characteristics of the compressor may be sent to the compressor to affect a change therein in a way that will ensure predictable, repeatable response.

Despite the advantages of feedforward-based control strategies for compressors, certain operating conditions may jeopardize system operability and component durability. As such, the use of compressors within a vehicular fuel cell system based on such strategies remains a challenge, especially as it relates to operating conditions that can lead to surge or related undesirable compressor phenomena. When a surge is present, the back pressure from the compressor's outlet is sufficiently high to prevent the compressor from pumping as designed. This causes the gas flow in the compressor to reverse direction, potentially leading to damage to the thrust bearings, blades and other upstream compressor components.

SUMMARY OF THE PRESENT INVENTION

A compressor surge mitigation system based on the use of a reactive algorithm can reduce the impact of a surge in situations where a surge condition is detected. It can initiate operational changes within at least one of a cathode backpressure valve and a compressor recirculation valve to reduce the impact of such condition on system operation. As stated above, the use of compressors within a fuel cell system presents additional challenges for the automotive industry, where failure to deliver precise amounts and temperature of a reactant gas to the fuel cells can significantly impact fuel cell performance that in turn impacts vehicle range, operating costs or the like. Utilizing different surge mitigation strategies of the present invention that accounts for the operating state of the compressor reduces the effects of a surge condition while minimizing the effects of such mitigation strategies on fuel cell performance. Significantly, the surge avoidance of the present invention is accomplished quickly, thereby avoiding undesirable operating conditions (such as overheating the compressor) while also promoting efficient operation of the fuel cell system.

In accordance with one aspect of the present invention, a method of avoiding surge in a vehicular fuel cell system is disclosed. The method includes maintaining, within a memory, a compressor map corresponding to the operational characteristics of a compressor used in the fuel cell system. The method also includes controlling the compressor using a default strategy such that its operation approaches a setpoint within the non-surge region of the compressor map. The method further includes detecting the presence of a surge condition within the compressor, and utilizing a first surge mitigation strategy that regulates a cathode backpressure valve in the event that the surge condition is detected and the compressor is operating at a speed above a threshold value. In the event that the surge condition is detected and the compressor is operating at a speed below the threshold value, the method adopts a second surge mitigation strategy that regulates a recirculation valve. In one form, the detection may be made through a processor-based protocol.

According to another aspect of the present invention, a controller for a vehicle fuel cell system is disclosed. The controller includes one or more processors and a non-transitory memory in communication with the one or more processors. The memory stores machine instructions that, when executed by the one or more processors, cause them to maintain a compressor map corresponding to the operation of a compressor used in the fuel cell system and to control the compressor using a default strategy such that its operation approaches a setpoint within the compressor map non-surge region. In one form, such a default strategy may (although not necessarily) correspond to a feedforward-based design. The instructions further cause the one or more processors to detect the presence of a surge condition within the compressor and to utilize a first surge mitigation strategy that regulates a cathode backpressure valve. The instructions additionally cause the one or more processors to utilize a second surge mitigation strategy that regulates a recirculation valve. More particularly, if a surge condition is detected and the compressor is operating at a speed above a threshold value, the controller instructs the cathode backpressure valve to adjust, while the recirculation valve may be adjusted in situations where surge is detected and the compressor is operating at a speed below the threshold value.

According to yet another aspect of the present invention, a vehicular fuel cell system is disclosed. The system includes a fuel cell stack configured to provide at least a portion of the motive power within the vehicle. The system also includes a compressor used to provide reactant (such as air or another oxygen-bearing fluid) to one or more fuel cells within the system. The system also includes a recirculation valve operatively connected to an inlet and outlet of the compressor. The system further includes a backpressure valve operatively connected to an outlet of the fuel cell stack. Operation of the fuel cell system is governed by a controller in communication with the recirculation valve, the compressor, and the backpressure valve. The controller has one or more processors and a non-transitory memory in communication therewith. The memory stores instructions that, when executed by the one or more processors, cause the one or more processors to maintain a compressor map corresponding to the operation of the compressor and to control the compressor using a default strategy such that the operation of the compressor approaches a setpoint within the compressor map non surge region. The instructions further cause the one or more processors to detect the presence of a surge condition within the compressor and to utilize a first surge mitigation strategy that regulates the cathode backpressure valve, if the surge condition is detected and the compressor is operating at a speed above a threshold value. The instructions yet also cause the one or more processors to utilize a second surge mitigation strategy that regulates the recirculation valve, if the surge condition is detected and the compressor is operating at a speed below the threshold value.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

Figure 1:
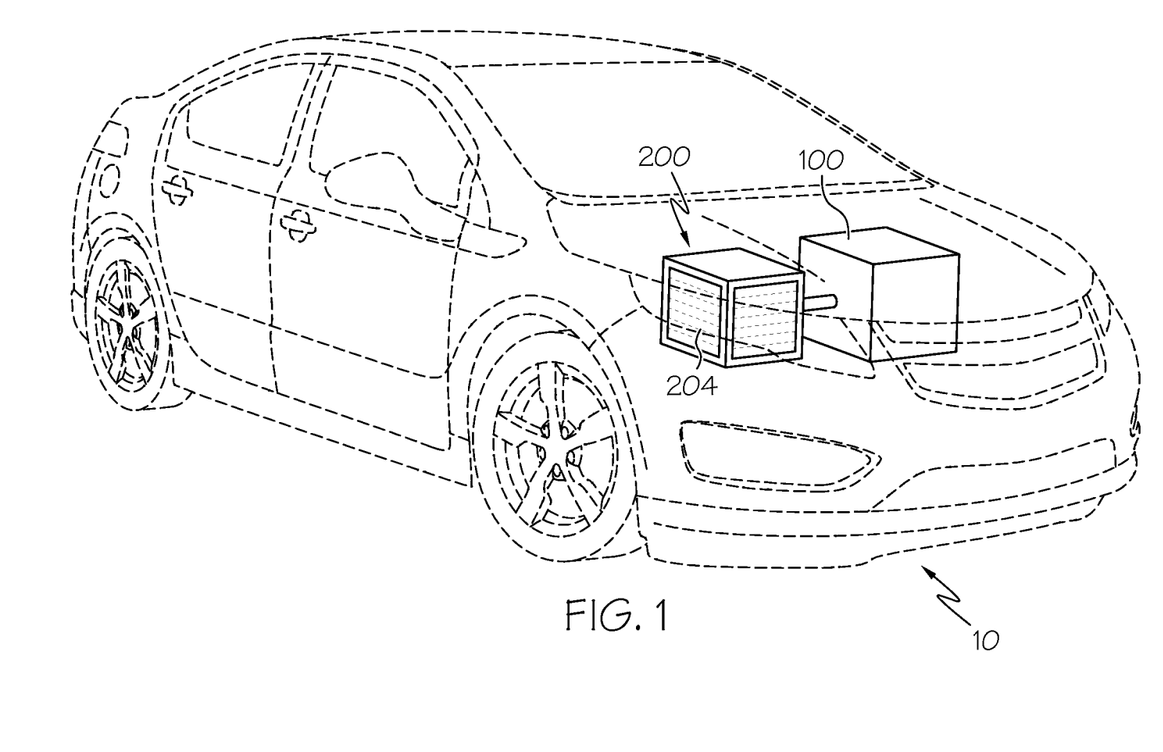
FIG. 1 is a schematic illustration of a vehicle having a fuel cell system.

Referring first to FIG. 1, vehicle 10 is shown, according to embodiments shown and described herein. Vehicle 10 (for example, a car, bus, truck, or motorcycle) includes engine 100, which may be a fully electric or a hybrid electric engine (e.g., an engine that uses both electricity and petroleum-based combustion for propulsion purposes). A fuel cell system 200 that includes at least one stack 204 of individual fuel cells may be used to provide at least a portion of the electric power needs of engine 100. In a preferred form, the fuel cell system 200 is a hydrogen-based one that may include one or more fuel storage tanks (not shown), as well as any number of valves, compressors, tubing, temperature regulators, electrical storage devices (e.g., batteries, ultra-capacitors or the like) and controllers that provide control over its operation.

Any number of different types of fuel cells may be used to make up the stack 204 of the fuel cell system 200; these cells may be of the metal hydride, alkaline, electrogalvanic or other variants. In one preferred (although not necessary) form, the fuel cells are polymer electrolyte membrane (also called proton exchange membrane, in either event, PEM) fuel cells. Stack 204 includes multiple such fuel cells combined in series and/or parallel in order to produce a higher voltage and/or current yield. The produced electrical power from fuel cell system 200 may then be supplied directly to engine 100 or stored within an electrical storage device (not shown) for later use by vehicle 10.

Figure 2:
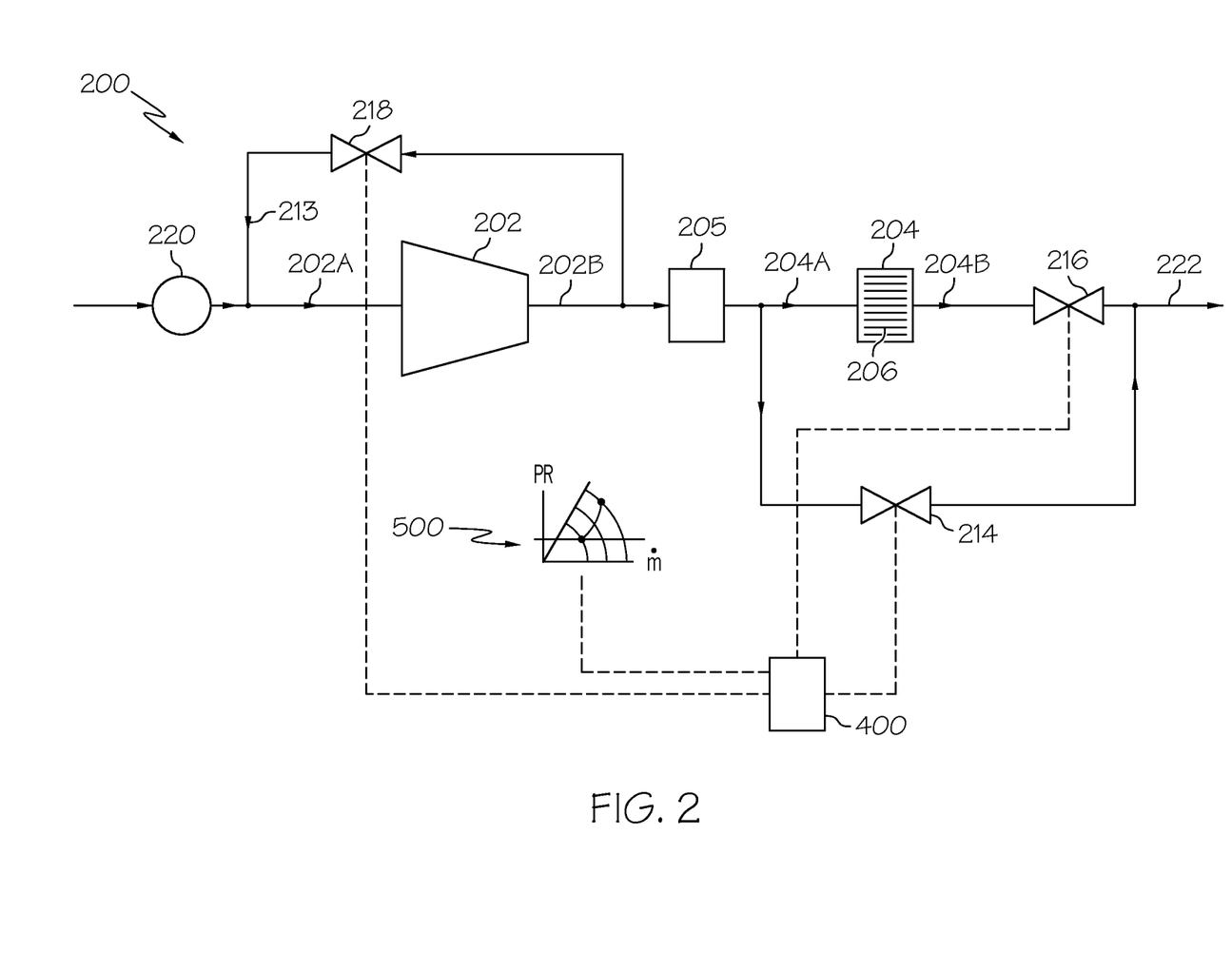
FIG. 2 is a schematic illustration of the fuel cell system shown in FIG. 1.

Referring next to FIG. 2, a schematic illustration of fuel cell system 200 is shown, where compressor 202 receives air at inlet 202A, pressurizes it, and provides it via outlet 202B to an inlet 204A of stack 204 where it is subsequently routed through a header, manifold or related flowpath (none of which are shown) to cathode 206, where the gas is used to catalytically react with hydrogen introduced to the anode (not shown) of fuel cell stack 204 to produce electrical power for vehicle 10. Exhaust gas and/or liquids are then removed from outlet 204B of stack 204.

Fuel cell system 200 also includes a number of valves that help to regulate the flow of gas throughout the system. For example, fuel cell system 200 may include a bypass valve 214 that allows some or all of the gaseous fuel to bypass fuel stack 204. Likewise, a cathode backpressure valve 216 is used to regulate the flow of exhaust from outlet 204B of stack 204. Fuel cell system 200 also includes a recirculation valve 218 that selectively connects outlet 202B and inlet 202A of compressor 202.

Fuel cell system 200 further includes a number of sensors that measure the characteristics of the gas within the system. For example, fuel cell system 200 may include flow meter 220 that measures the mass air flow from the fuel storage tank. Other non-limiting examples of sensors (not shown) in fuel cell system 200 include sensors that measure the pressure, temperature, density or related properties of the gas or gasses used in fuel cell system 200. Further examples include sensors (not shown) that measure the valve positions of valves 214, 216, 218 and the speed of compressor 202. In configurations that are particularly cost-sensitive, pressure sensors may be removed, and in such situations where no pressure sensors are used, pressure drop models will need to be included in the algorithm to account for changes in system 200 operating conditions.

A surge condition can develop in compressor 202 if the backpressure at outlet 202B is too high, thereby preventing the compressor 202 from pumping. In this case, the flow of gas reverses through compressor 202, potentially leading to damage to its blades, thrust bearings or other components. Several actions may be taken to mitigate a surge condition in compressor 202. In one case, recirculation valve 218 can be opened to help reduce the backpressure at outlet 202B of compressor 202. A calibrated rate limiter can be used to quickly open recirculation valve 218 and then smoothly close it back to its original position once the surge condition has ended. Significantly, there may be operating conditions where manipulating the recirculation valve 218 to mitigate a surge condition is disadvantageous to the system 200. For example, recirculating compressed air (with its concomitant rise in temperature) back into the compressor inlet 202A may put undesirable thermal loads on the compressor 202. Therefore, regulating recirculation valve 218 should be done when compressor 202 is operating at speeds below a corresponding threshold to reduce the impact of reintroducing already-compressed air.

Another potential way to mitigate a surge condition in compressor 202 is to open cathode backpressure valve 216 in order to reduce the pressure at outlet 202B of compressor 202. A calibrated rate limiter (not shown) may also be used to quickly open cathode backpressure valve 216 and then smoothly close it back to its original position once the surge condition has ended. However, because cathode backpressure valve 216 is also used to regulate the pressure at fuel stack 204, and because the power generated by fuel stack 204 depends on the humidity and partial pressure of oxygen, regulating the cathode backpressure valve 216 to mitigate a surge condition may, instead of controlling the stack pressure to a setpoint, result in reduced energy production by fuel cell system 200. Therefore, mitigating surge conditions needs to account for these and other impacts on system operability.

In one embodiment of the present invention, if the speed of compressor 202 is below a threshold value, recirculation valve 218 (which is easier to manipulate than the backpressure valve 216 because the latter also impacts stack 204 pressure and possibly can cause it to undesirably move away from its pressure setpoint) is opened when a surge condition is detected. However, if the speed of compressor 202 is above the threshold value, cathode backpressure valve 216 is preferably opened when a surge condition is detected, as manipulation of the recirculation valve 218 will introduce heated, compressed air back into the compressor inlet 202A that—if present in too great of a quantity—may raise the compressor inlet temperature to an undesirably high level. In addition, if the surge condition does not abate after a specified amount of time, cathode backpressure valve 216 may be held open and the driver of vehicle 100 alerted that maintenance is required.

Figure 3:
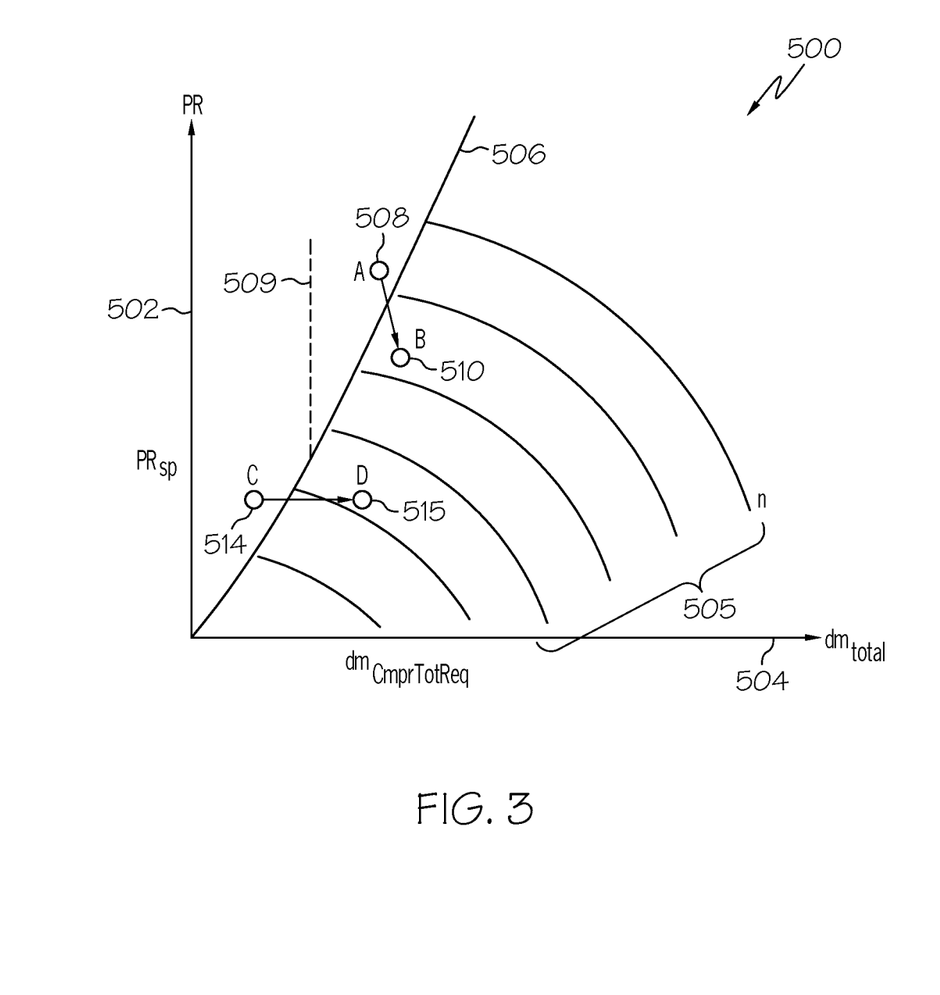
FIG. 3 is an illustration of a compressor map that makes up a portion of the system of FIG. 2.

Referring now to FIG. 3, a compressor map 500 is shown. Compressor map 500—which represents the operational characteristics of compressor 202 based on knowledge about the speed and pressure ratio of compressor 202 at reference operating conditions—provides a useful tool to predict the behavior of compressor 202 by allowing the prediction of surge conditions based on its operating state. Typically, compressor map 500 relates the pressure ratio 502 to the flow 504 of the gas through the compressor 202. A surge line 506 in the compressor map 500 also delimits those compressor 202 operating states that result in a surge condition from those that do not. More particularly, the map 500 indicates that surge is likely to occur when the backpressure of compressor 202 is high enough to prevent the discharge from the compressor outlet 202B from pumping; as mentioned above, such conditions (and their concomitant wild fluctuations in flow) can damage the compressor 202.

As shown, compressor map 500 utilizes the compressor's pressure ratio as y-axis 502, although it will be appreciated by those skilled in the art that another parameter may also be used along the y-axis. For example, the ratio of outlet to inlet temperatures may be used for y-axis 502 instead of the pressure ratio. The pressure ratio for compressor 202 in FIG. 2 can be calculated by taking the ratio of pressure at outlet 202B to the pressure at inlet 202A. Map 500 also utilizes the compressor's mass flow rate as x-axis 504. Although pressure ratio and mass flow rate are shown with respect to compressor map 500, it is to be understood that compressor map 500 may be constructed using other values as well. The value "n" denotes the speed of the compressor and map 500 is shown to include a number of speed lines 505 that correspond to different compressor speeds "n".

Surge line 506 of compressor map 500 denotes two regions of operation for the compressor. As shown, operating points to the left of surge line 506 result in a surge condition within the compressor, while operating points to the right of surge line 506 fall within a region of normal operation of the compressor, i.e., the compressor is able to pump compressed gas through its outlet. The distance between the operating point of the compressor and surge line 506, also referred to as the surge margin, provides a measure of how close the compressor is to a surge condition.

Points 508 (point A), 510 (point B), 514 (point C) and 515 (point D) illustrate various operating conditions that may be experienced by the compressor. In one form, a temperature limit line 509 may cross the surge line 506; this condition defines a speed threshold that can be used to determine where use of a surge mitigation strategy may be beneficial. In a first case, the compressor is at point 508 (point A), indicating that a surge condition is present. Here, point 508 (point A) is on the right side of the temperature limit line 509, which means the compressor 202 is running at high speed and high pressure ratio. Therefore, the cathode backpressure valve 216 should be opened instead of the recirculation valve 218 to avoid overheating the compressor 202. Opening the cathode backpressure valve 216 thereby moves the operating state of the compressor 202 from point 508 across surge line 506 to point 510 (point B), indicating that the compressor 202 is no longer in a surge condition.

In a second case, the compressor is at point 514 (point C), also indicating that a surge condition is present. Here, however, point 514 (point C) is on the left side of the temperature limit line 509 and it indicates that the compressor 202 is running at low speed and low pressure ratio, thereby allowing use of the recirculation valve 218 to mitigate the surge condition. Therefore, the surge margin may be increased to force the recirculation valve 218 open and move the operating state of the compressor to point 515 (point D), where the surge condition has abated and the compressor 202 is back within its normal operating range. Additional details of various operational conditions associated with compressor map 500 are addressed in a companion application entitled SYSTEMS AND METHODS FOR CONTROLLING A COMPRESSOR RECIRCULATION VALVE Ser. No. 13/660,020 which is filed on the same day as the present application by the assignee of the present invention and hereby incorporated in its entirety by reference.

Figure 4:
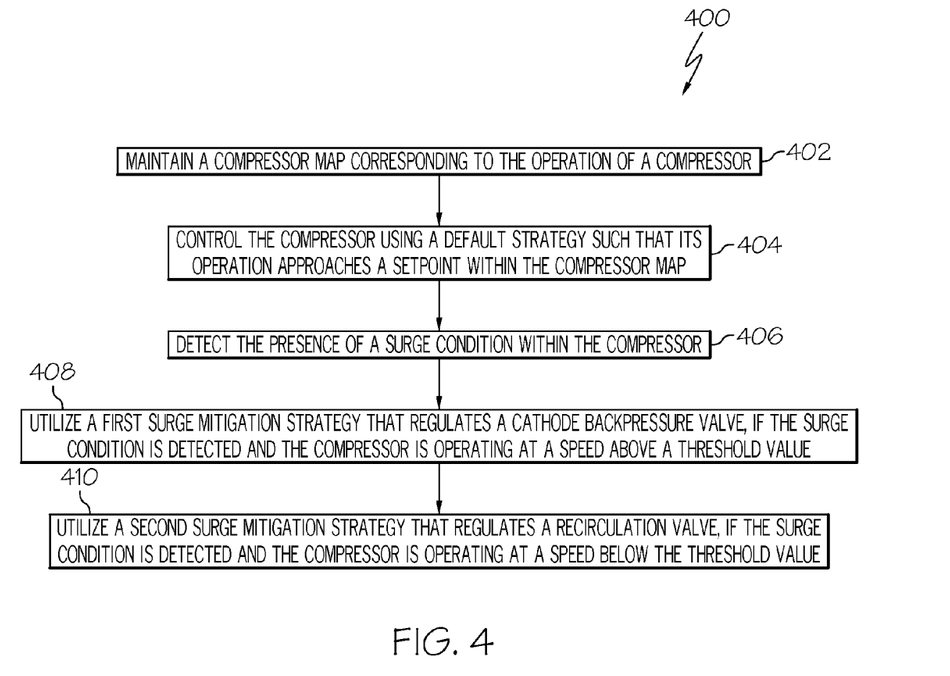
FIG. 4 is a flowchart of a method for mitigating a surge condition in the fuel cell system of FIG. 2.

Referring now to FIG. 4 in conjunction with FIG. 3, a flowchart corresponding to some of the steps of a method for mitigating a surge condition in the fuel cell system 200 of FIG. 2 is shown according to embodiments shown and described herein. The method may be implemented by, for example, one or more controllers 400 of the fuel cell system. Step 402 represents a compressor map (such as map 500 of FIG. 3) with operational parameters corresponding to the operation of compressor 202 of fuel cell system 200; in a preferred form, map 500 is maintained within a memory of controller 400. For example, the compressor map 500 may be stored in a memory 404 (shown in FIG. 5 and discussed in more detail below) of a controller 400 as a lookup table, data structure, or any other storage mechanism that allows the controller 400 to determine where the operating state of the compressor 202 is in relation to surge line 505. The compressor map 500 may be pre-loaded into the controller 400 using information provided by, for example, the manufacturer of the compressor 202, or built using a diagnostic routine that varies the operation of the compressor 202 and detects surge conditions.

At step 404, the compressor map 500 is used to control the compressor 202 using a default control strategy. In one form, a setpoint that corresponds to a desired operating point within the compressor map 500 serves as a target operating state for the compressor 202.

In one embodiment, the default control strategy may regulate the recirculation valve 218 in an attempt to keep the compressor 202 from entering the of the compressor map 500. For example, the compressor 202 pressure ratio, PR, may be calculated as:

$$PR = \frac{p_{CmprOut}}{p_{CmprIn}}$$

where $P_{CmprOut}$ is the pressure at the compressor outlet 202B and $P_{CmprIn}$ is the pressure at the compressor inlet 202A. The map 500 can then be used to determine the minimum flow through the compressor 202 to maintain the pressure ratio, without crossing the surge line into the surge region as follows:

$$\dot{m}_{CmprMin,Srg}{}^{Crtd} = \text{Surgeline}(PR)$$

where $\dot{m}_{CmprMin,Srg}{}^{Crtd}$ is the minimum flow based on the pressure ratio and the surge line that keeps the compressor 202 out of the surge region of the compressor map 500.

A desired surge margin distance may be utilized to account for uncertainties in the operation of the compressor 202 under normal conditions. In addition, the surge margin must be large enough to release a detected surge. In one example, the minimum flow incorporating the surge distance is:

$$\dot{m}_{CmprMin}{}^{Crtd} = \dot{m}_{CmprMin,Srg}{}^{Crtd} + \dot{m}_{CmprSrgDist}{}^{Sp}$$

where $\dot{m}_{CmprSrgDist}{}^{Sp}$ is the desired surge margin distance and $\dot{m}_{CmprMin}{}^{Crtd}$ is the corrected minimum flow for the compressor 202 incorporating the surge distance. The corrected flow can then be converted at the current operating conditions as follow:

$$\dot{m}_{CmprMin} = \dot{m}_{CmprMin}^{Crtd} * \frac{p_{CmprIn}}{p_{ref}} * \sqrt{\frac{T_{ref}}{T_{CmprIn}}}$$

where $\dot{m}_{CmprMin}{}^{Crtd}$ is the corrected flow calculated previously, $T_{ref}$ is a reference temperature, $T_{CmprIn}$ is the temperature at the inlet of the compressor 202, $p_{CmprIn}$ is the pressure at the compressor inlet 202A, and $p_{ref}$ is a reference pressure.

The flow bypassed by the recirculation valve 218 may then be calculated as the minimum flow minus the minimum value of the feedback and setpoint of the discharge flow for the compressor 202:

$$\dot{m}_{CmprRcrcVlvSrg} = \dot{m}_{CmprMin} - \text{Min}(\dot{m}_{CmprAssmDchrg}{}^{Sp}, \dot{m}_{CmprAssmDchrg})$$

where $\dot{m}_{CmprAssmDchrg}{}^{Sp}$ is the setpoint of the discharge flow for the compressor 202, $\dot{m}_{CmprAssmDchrg}$ is the feedback of the discharge flow, and $\dot{m}_{CmprMin}$ is the minimum flow calculated previously.

The requested valve position kVlv for the recirculation valve 218 is calculated based on the valve model. For subcritical gas flow, the requested valve position may be calculated as:

$$kVlv_{CmprRcrcVlvSrg}^{Req,Subcrtcl} = a * \frac{\dot{m}_{RcrcVlvSrg}}{M_{CaSplyAir}} * \sqrt{\frac{M_{CaSplyAir} * T_{CmprOut}}{(p_{CmprOut})^2 - (p_{CmprIn})^2}}$$

and calculated as follows for critical gas flow:

$$kVlv_{CmprRcrcVlvSrg}^{Req,Crtcl} = b * \frac{\dot{m}_{CmprRcrcVlvSrg}}{M_{CaSplyAir}} * \sqrt{\frac{M_{CaSplyAir} * T_{CmprOut}}{(p_{CmprOut})^2}}$$

where $M_{CaSplyAir}$ is the molecular weight of the gas through the recirculation valve 218, $\dot{m}_{CmprRcrcVlvSrg}$ is the flow bypassed by the recirculation valve 218 calculated previously, $T_{CmprOut}$ is the temperature at the outlet of the compressor 202, $p_{CmprOut}$ is the pressure at the compressor outlet 202B, $p_{CmprIn}$ is the pressure at the compressor inlet 202A, and a and b are the coefficients from the unit conversion for the subcritical and critical gas flow, respectively. In some embodiments, a and b are equal to 4.633 and 5.375, respectively. The maximum of the subcritical and critical gas flow values can then be used as the requested valve position:

$$kVlv_{CmprRcrcVlvSrg}^{Req} = \text{Max}(kVlv_{CmprRcrcVlvSrg}^{Req,Subcrtcl}, kVlv_{CmprRcrcVlvSrg}^{Req,Crtcl}).$$

The presence of a surge condition within the compressor 202 is detected and entered into controller 400 at interface 406. At interface 408, if a surge condition is detected and the compressor 202 is operating at a speed at or above a threshold value, a first surge mitigation strategy is used that regulates the cathode backpressure valve 216. In some embodiments, the command used to control the cathode backpressure valve 216 to a certain position is increased to force the backpressure valve 216 to open. A calibrated rate limiter (not shown) may be used to make the valve 216 open quickly if compressor 202 surge is detected and close smoothly and slowly back to its original position when the surge condition abates. When the surge condition abates, control over the fuel cell system 200 may also return to the default control strategy; such default control strategy may include or be coupled to a surge protection strategy in order to help prevent another surge condition from occurring. Such a protection strategy may include operating with ample margins.

If a surge condition is detected and the compressor 202 is operating at a speed below a threshold value, a second surge mitigation strategy is used that regulates the recirculation valve 218 through connection 410 between the valve and interface 408. In some embodiments, the second surge mitigation strategy differs from the default control strategy in that the surge distance setpoint is increased to force the recirculation valve 218 to open more. For example, a surge mitigation distance value may be added to the surge distance setpoint (e.g., $\dot{m}_{CmprSrgDist}{}^{Sp}$ described above) of the default control strategy. By increasing the surge distance setpoint, the recirculation valve 218 is forced further open, thereby moving the operating point of the compressor 202 back into the normal region of the compressor map 500. A calibrated rate limiter may be used to make the valve open quickly if compressor 202 surge is detected and close smoothly and slowly back to its original position when the surge condition abates. When the surge condition abates, control over the fuel cell system 200 may also return to the default control strategy in the manner discussed above.

Figure 5:
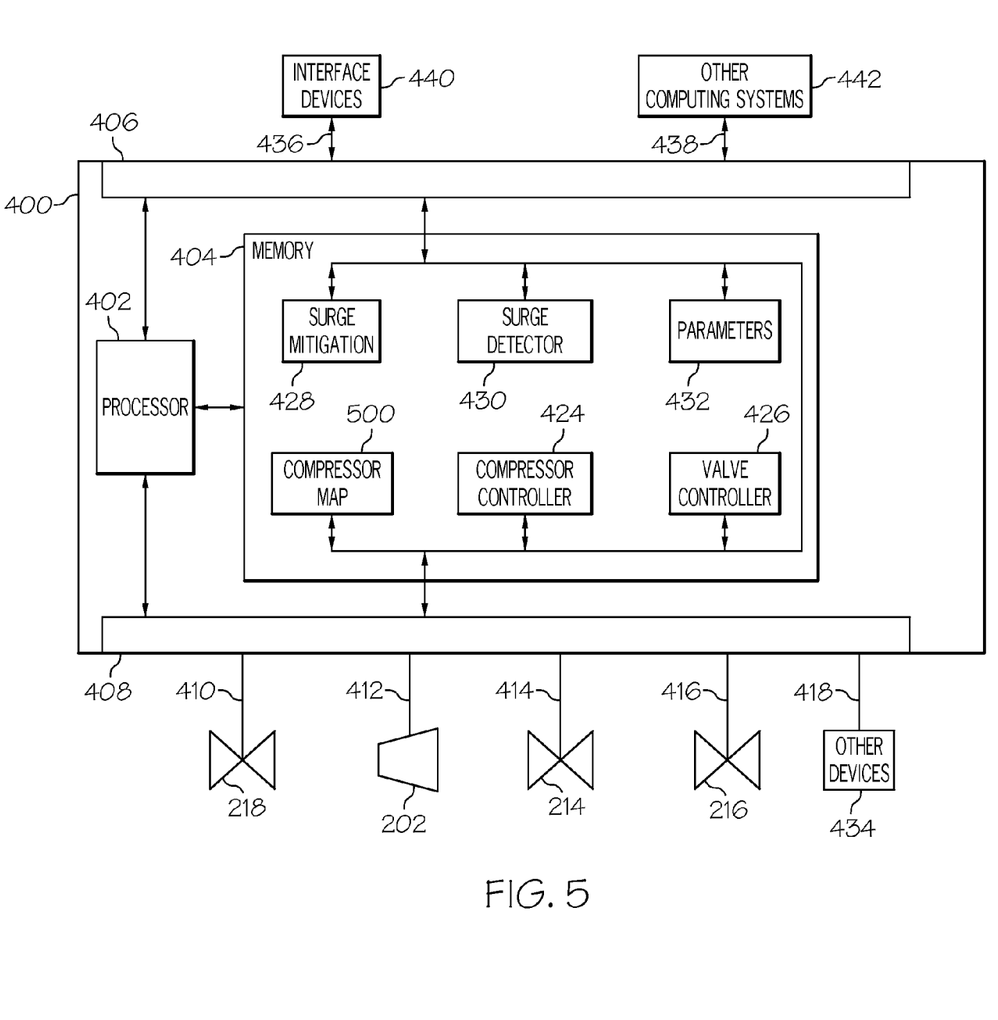
FIG. 5 is a schematic illustration of a controller that makes up a portion of the fuel cell system of FIG. 2.

Referring now to FIG. 5 in conjunction with FIG. 2, controller 400 includes processor 402, which may be one or more processors (e.g., a microprocessor, an application specific integrated circuit (ASIC), field programmable gate array, central processing unit (CPU) or the like) communicatively coupled to memory 404 and interfaces 406 and 408. Memory 404 may be any form of memory capable of storing machine-executable instructions that implement one or more of the functions disclosed herein, when executed by processor 402. For example, memory 404 may be a RAM, ROM, flash memory, hard drive, EEPROM, CD-ROM, DVD, other forms of non-transitory memory devices, or any combination of different memory devices. Furthermore, controller 400 may be configured as a computer where—in the von Neumann sense—it includes a CPU, input, output and memory (both working (i.e., data-containing) memory and permanent (i.e., instruction-containing) memory). Likewise, controller may be configured to cooperate with (but be a distinct machine from) a computer.

Controller 400 communicates with various devices in fuel cell system 200 and, in some cases, provides control over the devices. In some embodiments, controller 500 provides either direct or indirect control over recirculation valve 218, compressor 202, cathode backpressure valve 216, and/or other devices 418 (e.g., bypass valve 214 or the like). Controller 400 also receives, either directly or indirectly, sensor measurements from fuel cell system 200 to monitor the operation of the system. For example, controller 400 may receive temperature, pressure, flow, density, valve position, speed, or other measurements from sensors associated with compressor 202, recirculation valve 218, and/or cathode backpressure valve 216. In addition, controller 400 may also receive sensor readings from other devices 418 (e.g., flow meter 220, sensors associated with bypass valve 214, or the like). It should be appreciated that any number of different combinations of sensors and sensor configurations may be used, without deviating from the principles or teachings of the present disclosure.

Connections 410, 412, 414, and 416 may be any combination of hardwired or wireless connections that provide connections between controller 400 and compressor 202, recirculation valve 218, cathode backpressure valve 216, and other devices 434. For example, connection 410 may be a hardwired connection, while connection 412 may be a wireless connection. In some embodiments, connections 410, 412, 414, and 416 are part of a shared data line that conveys measurement data to controller 400 and control commands to the devices of fuel cell system 200 connected to controller 400. In yet other embodiments, connections 410, 412, 414, and 416 may include one or more intermediary circuits (e.g., other microcontrollers, signal filters, etc.) and provide an indirect connection between controller 400, compressor 202, recirculation valve 218, cathode backpressure valve 216, and other devices 434.

Interface 408 is configured to receive measurement data and to transmit control commands to recirculation valve 218, cathode backpressure valve 216, and other devices 434. For example, interface 408 may include one or more wireless transceivers, if any of connections 410, 412, 414, and 416 are wireless connections. Interface 408 may also include one or more wired ports, if any of connections 410, 412, 414, and 416 are wired connections. Interface 408 may also include circuitry configured to digitally sample or filter received measurement data. For example, interface 408 may sample temperature data received from a temperature sensor of compressor 202 via connection 412 at discrete times (e.g., k, k+1, k+2, etc.) to produce discrete temperature values (e.g., T(k), T(k+1), T(k+2), etc.).

In some embodiments, controller 400 may also communicate with interface devices 440 (e.g., a display, a speaker, a printer, or any other electronic device that provides and/or receives data to and from a user) via connection 436. Controller 400 may also communicate with other computing systems 442 (e.g., another controller, a portable electronic device, a server, or the like) via connection 438 that (along with connection 436) may be wired or wireless. For example, other computing systems 442 may include a server located remotely from vehicle 10 and connection 438 may be a wireless connection. For example, a server may communicate status condition information via cellular, WiFi, radio, satellite connection or the like. Interface 406 may also include one or more transceivers configured to send and receive location information for vehicle 100. For example, interface 406 may include a GPS receiver or cellular receiver that utilizes triangulation to determine the location of vehicle 100. In other embodiments, interfaces 406 and 408 may be a single interface for controller 400.

Memory 404 is shown to include the previously-described compressor map 500 (from FIG. 2) that corresponds to the operation of compressor 202. In some embodiments, memory 404 also includes compressor controller 424 that receives measurement data concerning compressor 202 and uses the measurement data to provide control over compressor 202. For example, compressor controller 424 may receive pressure and/or temperatures measurements taken at the inlet and outlet of compressor 202. Compressor controller 424 may also receive flow measurements from compressor 202 and use the received measurements with compressor map 500 to control it. For example, compressor controller 424 may use compressor map 500 to determine one or more setpoints for the pressure ratio, flow rate, and/or surge margin as part of a default control strategy that acts to keep compressor 202 from surging. The compressor controller 424 acts as the control logic inside the main controller 400 to generate the operating commands for compressor 202, and may or may not be separate from the compressor 202.

Valve controller 426 uses the setpoints for the pressure ratio, flow rate, and/or surge margin determined by compressor controller 424 to regulate recirculation valve 218 and/or cathode backpressure valve 216. For example, valve controller 426 may determine a requested valve position for recirculation valve 218 that moves the operating state of compressor 202 away from the surge line of compressor map 500. Valve controller 426 then generates a control command that causes recirculation valve 218 to open or close accordingly. In some embodiments, valve controller 426 generates recirculation valve control commands and/or cathode backpressure valve control commands that cause the valves to adjust their position. The control commands may provide direct control or, in some cases, indirect control via a local controller. For example, recirculation valve 218 and/or cathode backpressure valve 216 may include a local controller that actually controls the valve's position. In such a case, a valve control command may cause the local controller to adjust the valve to a position specified by the valve control command.

Surge detector 430 is used to sense if a surge occurs. Surge mitigator 428 receives an indication of a detected surge condition from surge detector 430 and utilizes a surge mitigation strategy to move the operation of compressor 202 out of the surge region of compressor map 500. In one embodiment, surge mitigator 428 determines if the speed and/or the inlet temperature of compressor 202 is at or above a threshold (e.g., as part of parameters 432). If it is, surge mitigator 428 utilizes a first surge mitigation strategy. For example, the first mitigation strategy may include surge mitigator 428 determining an adjusted valve position for cathode backpressure valve 216 and valve controller 426 generating a cathode backpressure valve control command that causes cathode backpressure valve 216 to open. Valve controller 426 is configured to provide valve control logic, which will generate the position command for smart valves or voltage commands for more traditional valves without so-called "smart" features. Thus, if the valve being manipulated is configured as a smart valve, it will have its own control logic in its own controller to convert the position command from valve controller 426 to a voltage command to control its movement. If the valve being manipulated does not include its own control logic, the valve controller 426 will send the voltage command to the valve directly.

If the speed and/or inlet temperature of compressor 202 is below a threshold, surge mitigator 428 utilizes a second surge mitigation strategy that regulates recirculation valve 218. For example, surge mitigator 428 may determine a surge mitigation distance value that can be added to the surge margin setpoint. In response to increasing the surge margin, valve controller 426 may generate a recirculation valve control command that causes recirculation valve 218 to further open. If surge detector 430 determines that the first or second surge mitigation strategy utilized by surge mitigator 428 was successful (e.g., compressor 202 is no longer surging), surge mitigator 428 may return control to the default strategy employed by compressor controller 424. In some embodiments, surge detector 430 may also store a history of surge events in memory 404 and may provide the history of surge events to interface devices 440 or other computing systems 442.

In some embodiments, surge detector 430 may further determine if a surge condition has exceeded a time limit (e.g., a time value stored in parameters 432). Surge mitigator 428 may receive an indication of this from surge detector 430 and begin utilizing a maintenance mode that regulates the cathode backpressure valve. In the maintenance mode, valve controller 426 issues a cathode backpressure valve command that causes cathode backpressure valve 216 to remain open. In the maintenance mode, surge mitigator 428 may also generate an alert and provide it to interface devices 440 (e.g., to alert the driver of vehicle 100 that maintenance is needed) and/or to other computing systems 442. The maintenance mode overrides the operation of the surge mitigation strategies until controller 400 receives a command (e.g., as part of parameters 432) that ends the maintenance mode. For example, after a mechanic has addressed the underlying problem in fuel cell system 200, the mechanic may utilize interface devices 440 or other computing systems 442 to end the maintenance mode.

Parameters 432 include any values that alter the functions of controller 400. For example, parameters 432 may include one or more threshold values for the speed of compressor 202, temperature thresholds, and/or a surge condition time limit. Parameters 432 may also include values that enable or disable functions of controller 400. For example, parameters 432 may include a parameter that determines if surge mitigator 428 is active (e.g., if controller 400 is to uses the first and second surge mitigation strategies). Parameters 432 may further include values that determine how information about fuel cell system 200 is conveyed to interface devices 440 and/or to other computing systems 442 (e.g., how often, what format, and the like).

In some cases, some or all of parameters 432 may be pre-loaded into memory 404 (e.g., by the manufacturer of controller 400, the manufacturer of vehicle 100, or the like). In other cases, some or all of parameters 432 may be provided to controller 400 via interface devices 440 and/or other computing systems 442. Further some or all of parameters 432 may be updated or deleted via interface devices 440 and/or other computing systems 442.

Although controller 400 is shown in FIGS. 2 and 5 as a singular device, it is to be understood that this is merely exemplary and is not intended to be limiting. For example, processor 402 may include any number of processors of any number of computing devices that execute the instructions stored in memory 404. Likewise, memory 404 may include any number of memory devices and is not limited to memory devices located within the same housing as processor 402. In some cases, processor 402 and/or memory 404 may even be located external to vehicle 10.

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

What is claimed is:

1. A method for avoiding surge in a vehicular fuel cell system compressor, said method comprising:
    maintaining, within a memory, a compressor map corresponding to the operation of the compressor;
    controlling the compressor using a default strategy such that its operation approaches a setpoint within the compressor map;
    sensing a surge condition within the compressor;
    determining if an operating speed of the compressor is at or above a threshold value or below the threshold value;
    controlling the surge condition with a first surge mitigation strategy if the operating speed of the compressor is at or above the threshold value or a second surge mitigation strategy if the operating speed of the compressor is below the threshold value;
    regulating a cathode backpressure valve with the first surge mitigation strategy; and
    regulating a recirculation valve with the second mitigation strategy.

2. The method of claim 1, wherein the cathode backpressure valve is regulated by generating a cathode backpressure valve control command that causes the cathode backpressure valve to open.

3. The method of claim 1, further comprising maintaining, within the memory, a surge distance setpoint indicative of the distance between the setpoint and a surge line of the compressor map.

4. The method of claim 3, wherein the recirculation valve is regulated by adjusting the setpoint by adding a surge mitigation distance value to the surge distance setpoint.

5. The method of claim 4, further comprising generating a recirculation valve control command that causes the recirculation valve to open.

6. The method of claim 1, further comprising:
    detecting an end to the surge condition; and
    returning control of the compressor to the default strategy.

7. The method of claim 1, wherein at least one of the cathode backpressure valve and the recirculation valve is regulated to remain in an open position if the surge condition exceeds a time limit, further comprising providing an alert to an interface device.

8. A controller for a vehicle fuel cell system comprising:
at least one processor; and
a non-transitory memory in communication with the at least one processor, wherein the memory stores machine instructions that, when executed by the at least one processor, cause the at least one processor to:
   maintain a compressor map corresponding to the operation of a compressor of the vehicle fuel cell system,
   control the compressor using a default strategy such that its operation approaches a setpoint within the compressor map,
   detect the presence of a surge condition within the compressor,
   determine if an operating speed of the compressor is at or above a threshold value or if the speed of the compressor is below the threshold value;
   control the surge condition with a first surge mitigation strategy if the operating speed of the compressor is at or above the threshold value or a second surge mitigation strategy if the operating speed of the compressor is below the threshold value,
      regulate a cathode backpressure valve with the first surge mitigation strategy, and
      regulate a recirculation valve with the second mitigation strategy.

9. The controller of claim 8, wherein the instructions further cause the at least one processor to generate a cathode backpressure valve control command that opens the cathode backpressure valve as part of the first surge mitigation strategy.

10. The controller of claim 8, wherein the instructions further cause the at least one processor to maintain a surge distance setpoint indicative of the distance between the setpoint and a surge line of the compressor map.

11. The controller of claim 10, wherein instructions further cause the at least one processor to adjust the setpoint by adding a surge mitigation distance value to the surge distance setpoint as part of the second surge mitigation strategy.

12. The controller of claim 11, wherein the instructions further cause the at least one processor to generate a recirculation valve control command that opens the recirculation valve as part of the second surge mitigation strategy.

13. The controller of claim 8, wherein the instructions further cause the at least one processor to detect an end to the surge condition and to control the compressor using the default strategy in the event the surge condition is detected.

14. The controller of claim 8, wherein the instructions further cause the at least one processor to control at least one of the cathode backpressure valve and the recirculation valve to remain open and provide an alert to an interface device if the surge condition exceeds a time limit.

15. A vehicle fuel cell system comprising;
a fuel cell stack;
a compressor operatively connected to the fuel cell stack to provide compressed gas thereto;
a recirculation valve operatively connected to an inlet and outlet of the compressor;
a backpressure valve operatively connected to an outlet of the fuel cell stack; and
a controller in communication with the recirculation valve, the compressor and the backpressure valve, the controller comprising at least one processor and a non-transitory memory in signal communication therewith such that instructions stored in the memory cause the at least one processor to:
   maintain a compressor map corresponding to the operation of the compressor,
   control the compressor using a default strategy such that the operation of the compressor approaches a setpoint within the compressor map,
   detect the presence of a surge condition within the compressor,
   determine if an operating speed of the compressor is at or above a threshold value or if the speed of the compressor is below the threshold value;
   control the surge condition with a first surge mitigation strategy if the operating speed of the compressor is at or above a threshold value or a second surge mitigation strategy if the operating speed of the compressor is below the threshold value,
      regulate a cathode backpressure valve with the first surge mitigation strategy, and
      regulate a recirculation valve with the second mitigation strategy.

16. The controller of claim 15, wherein the instructions further cause the at least one processor to generate a cathode backpressure valve control command that opens the cathode backpressure valve as part of the first surge mitigation strategy.

17. The controller of claim 15, wherein the instructions further cause the at least one processor to maintain a surge distance setpoint indicative of the distance between the setpoint and a surge line of the compressor map.

18. The controller of claim 17, wherein instructions further cause the at least one processor to adjust the setpoint by adding a surge mitigation distance value to the surge distance setpoint as part of the second surge mitigation strategy.

19. The controller of claim 18, wherein the instructions further cause the at least one processor to generate a recirculation valve control command that opens the recirculation valve as part of the second surge mitigation strategy.

20. The controller of claim 15, wherein the instructions further cause the at least one processor to detect an end to the surge condition and to control the compressor using the default strategy.

* * * * *